United States Patent [19]

Silagy

[11] Patent Number: 5,027,845

[45] Date of Patent: * Jul. 2, 1991

[54] COUPLING WITH HEAT FUSIBLE ACTUATOR MEMBER

[75] Inventor: Richard J. Silagy, Cleveland, Ohio

[73] Assignee: Tuthill Corporation, Cleveland, Ohio

[*] Notice: The portion of the term of this patent subsequent to Jun. 12, 2007 has been disclaimed.

[21] Appl. No.: 512,785

[22] Filed: Apr. 20, 1990

Related U.S. Application Data

[62] Division of Ser. No. 390,615, Aug. 7, 1989, Pat. No. 4,932,431.

[51] Int. Cl.⁵ .................................... F16L 37/28
[52] U.S. Cl. ................................. 137/74; 137/75; 251/149.6
[58] Field of Search .............. 251/149.6; 137/172, 137/174, 175

[56] References Cited

U.S. PATENT DOCUMENTS

| | | | |
|---|---|---|---|
| 2,048,387 | 7/1936 | Johnsen | 137/75 |
| 2,048,388 | 7/1936 | Johnsen | 137/75 X |
| 2,048,389 | 7/1936 | Johnsen | 137/75 |
| 3,245,423 | 4/1966 | Hansen et al. | |
| 3,532,101 | 9/1967 | Snyder, Jr. | |
| 4,792,115 | 12/1988 | Jindra et al. | |

Primary Examiner—John C. Fox
Attorney, Agent, or Firm—Tarolli, Sundheim & Covell

[57] ABSTRACT

As a coupling is connected, an improved heat fusible actuator member in a plug assembly moves a value member in a socket assembly from a closed position to an open position against the influence of a biasing spring. When the coupling is exposed to excessive heat, the one piece actuator member fuses and is deformed under the influence of force applied against the actuator member by the valve member to enable the valve member to close. In one embodiment, the actuator member includes a cylindrical sleeve which is resiliently compressible to enable retaining lugs on an inner end of the sleeve to engage in an annular retaining surface on a metal plug body. At the same time, an annular rim on an outer end of the sleeve engages a circular outer end surface of the plug body. A bridging member extends across the fluid passage through the sleeve and is engaged by the valve member. In another embodiment, the annular rim is omitted and retaining lugs engage in an annular groove inside the plug body to hold the actuator member against axial movement.

9 Claims, 3 Drawing Sheets

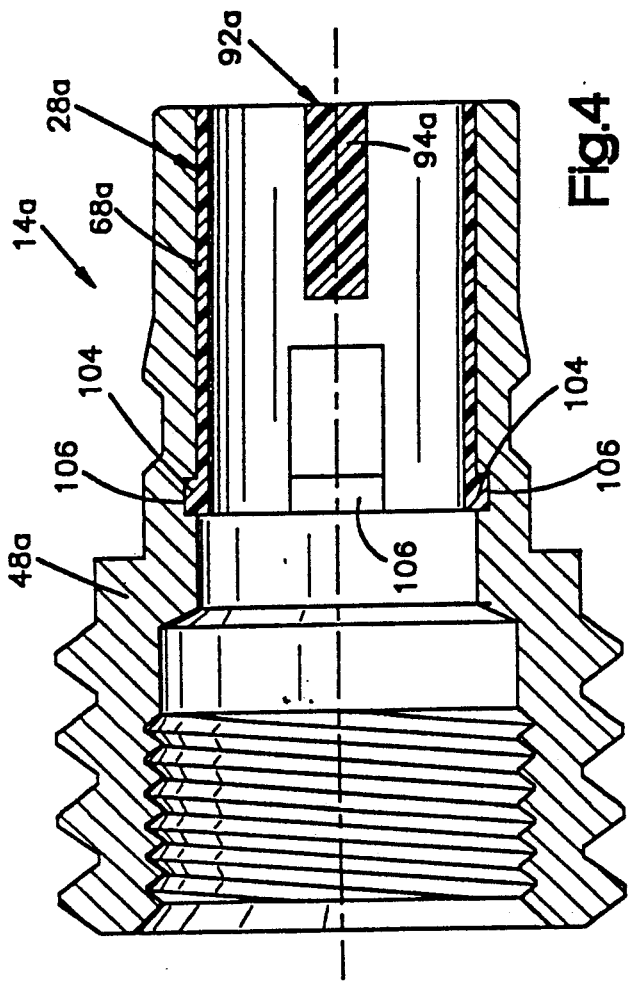
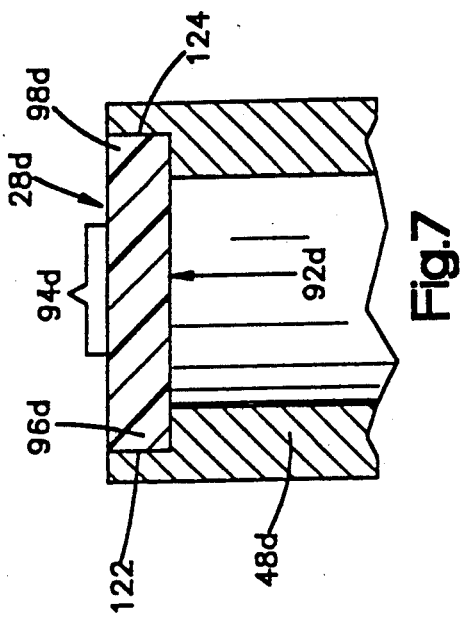
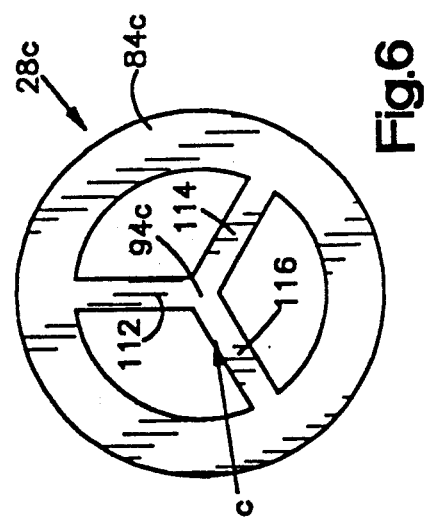
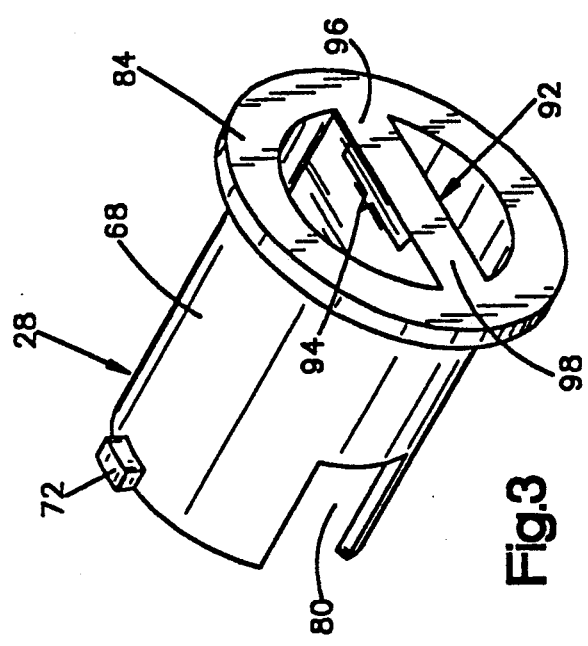
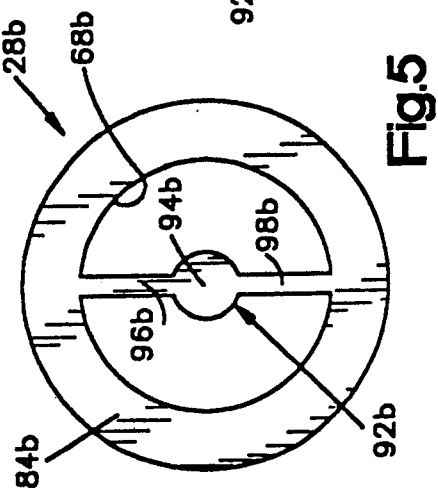

COUPLING WITH HEAT FUSIBLE ACTUATOR MEMBER

This is a divisional of co-pending application Ser. No. 07/390,615 filed on Aug. 7, 1989, now U.S. Pat. No. 4,932,431.

BACKGROUND OF THE INVENTION

This invention relates generally to a new and improved coupling which is utilized to interconnect a pair of conduits. More specifically, the invention relates to a coupling which interrupts fluid communication between the conduits upon exposure of the coupling to excessive heat.

A known coupling having a socket valve which is closed to interrupt fluid communication between a pair of conduits upon exposure of the coupling to excessive heat, is disclosed in U.S. Pat. No. 3,245,423. The coupling disclosed in this patent includes a plug assembly having a valve actuator member. The valve actuator member includes a cylindrical metal sleeve which is soldered to a metal plug body. A bridge portion extends from one end of the sleeve and engages the socket valve to hold the valve in the open condition.

Upon exposure of the coupling to excessive heat, the solder securing the sleeve to the plug body fuses. This allows the sleeve to move axially into the plug body under the influence of force applied against the bridge portion by the socket valve. As the sleeve and bridge portion move axially into the plug body, the socket valve closes to block fluid flow through the coupling.

The cost of assembling the coupling disclosed in U.S. Pat. No. 3,245,423 is increased by soldering the sleeve to the metal plug body. In addition, the forming of the one piece metal bridge portion and sleeve increases the cost of making the coupling.

SUMMARY OF THE PRESENT INVENTION

The present invention provides a new and improved coupling for use in connecting a pair of conduits in fluid communication. The coupling includes plug and socket assemblies in which an actuator member moves a valve member to an open condition against the influence of a biasing spring as the plug and socket assemblies are interconnected. When the coupling is exposed to excessive heat, the actuator member fuses and is deformed under the influence of force applied against the actuator member by the valve member. As the actuator member deforms, the valve member moves from an open condition to a closed condition.

The actuator member is formed of one piece of heat fusible polymeric material. In some of the embodiments of the invention, the actuator member includes a sleeve. The sleeve is disposed in and is connected with the plug body. A bridging portion extends inwardly from the sleeve. The bridging portion is engaged by the valve member and retains the valve member in an open condition prior to exposure of the coupling to excessive heat.

Upon exposure of the coupling to excessive heat, at least a portion of the polymeric material of the actuator member fuses and is deformed by force applied against the actuator member by the valve member. In one embodiment of the invention, the bridging portion of the actuator member is deformed when the coupling is exposed to excessive heat. In another embodiment of the invention, a retainer which interconnects the sleeve and the plug body is deformed when the coupling is exposed to excessive heat.

Accordingly, it is an object of this invention to provide a new and improved coupling for use in connecting a pair of conduits in fluid communication and wherein the coupling includes a heat fusible actuator member which is deformed upon exposure of the coupling to excessive heat to release a valve member for movement from an open condition to a closed condition.

Another object of this invention is to provide a new and improved coupling as set forth in the preceding object and wherein a central portion of the actuator member is deformed upon exposure of the coupling to excessive heat.

Another object of this invention is to provide a new and improved plug for engagement with a socket of a plug and socket coupling and wherein a one piece heat fusible actuator member is disposed in the plug body and the actuator member having a tubular cylindrical sleeve, a mounting portion which interconnects the sleeve and the plug body, and a bridging portion which extends inwardly from the sleeve and engages the valve member in a socket to retain the valve member in an open condition prior to exposure of the plug to excessive heat.

BRIEF DESCRIPTION OF THE DRAWINGS

The foregoing and other objects and features of the present invention will become more apparent upon consideration of the following description taking in connection with the accompanying drawings wherein:

FIG. 3 is an enlarged pictorial illustration of the actuator member of FIGS. 1 and 2;

FIG. 4 is a sectional view of a plug assembly which includes a second embodiment of the actuator member;

FIG. 5 is an end view of an embodiment of the actuator member in which a bridging portion has a relatively large central area and relatively small connecting portions;

FIG. 6 is an end view of an embodiment of the invention in which the bridging portion is formed by a plurality of interconnected sections; and FIG. 7 is a sectional view of an embodiment of the actuator member in which a heat fusible bridging portion is mounted in one end of the metal plug body.

DESCRIPTION OF SPECIFIC PREFERRED EMBODIMENTS OF THE INVENTION

Coupling

Figure 1:
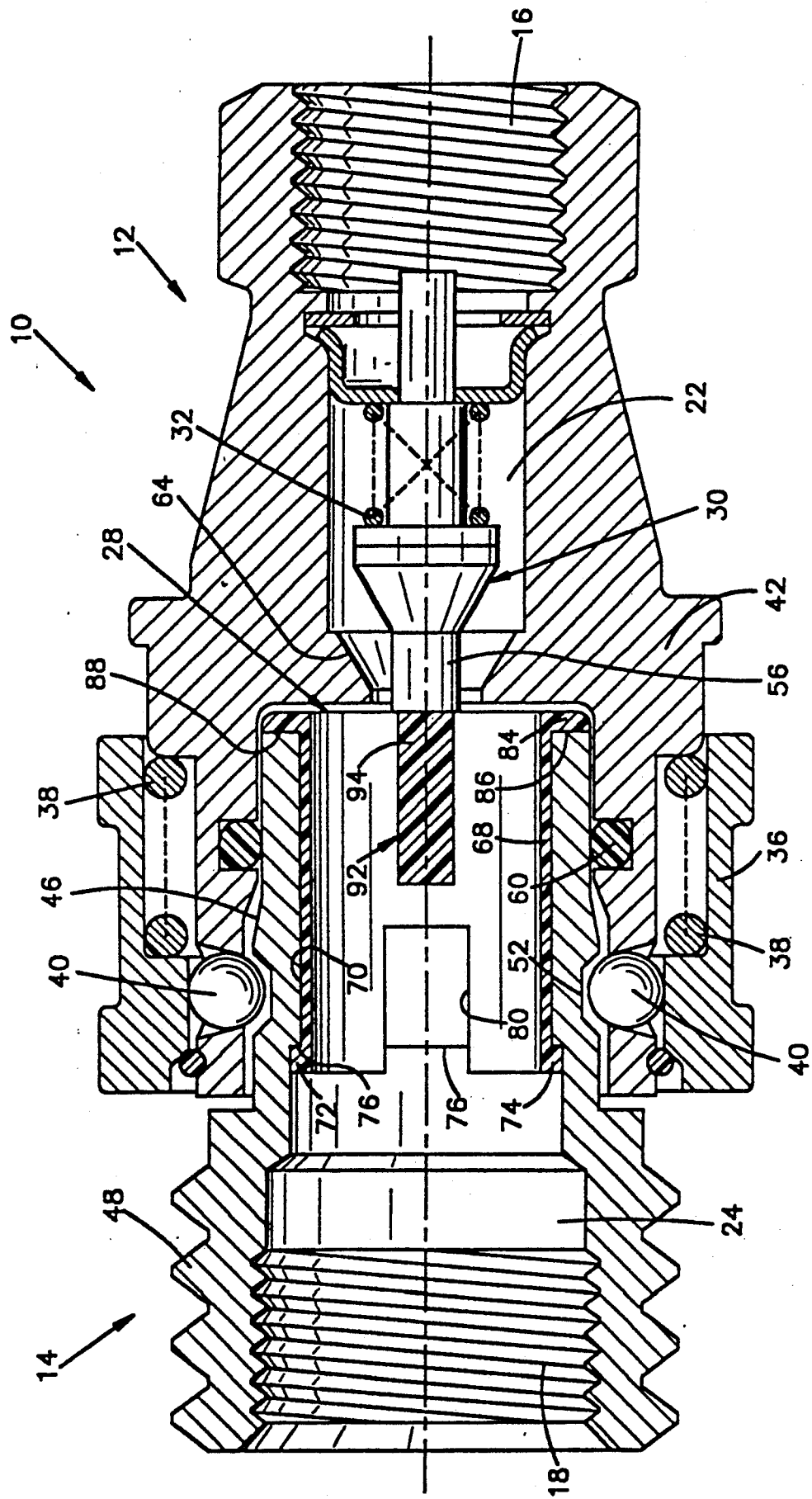
FIG. 1 is a sectional view of a coupling in which a valve member is held in an open condition by an actuator member constructed in accordance with the present invention.

A coupling 10 (FIG. 1) includes a socket assembly 12 in which a plug assembly 14 is telescopically received. Threaded end portions 16 and 18 of the socket assembly 12 and plug assembly 14 are connected with fluid conduits (not shown). Prior to exposure of the coupling 10 to excessive heat, a fluid flow passage 22 in the socket assembly 12 is connected in fluid communication with a fluid flow passage 24 in the plug assembly 14 to connect the fluid conduits in communication with each other.

Upon exposure of the coupling 10 to excessive heat, an actuator member 28 fuses and is deformed. Deformation of the actuator member 28 enables a valve member 30 in the socket assembly 12 to move from the open condition of FIG. 1 to the closed condition of FIG. 2 under the influence of a biasing spring 32. Upon movement of the valve member 30 to the closed position, fluid flow through the passages 22 and 24 in the plug and socket assemblies 12 and 14 are blocked. Of course, this blocks fluid communication between the conduits connected with the plug and socket assemblies 12 and 14.

To interconnect the socket assembly 12 and plug assembly 14, a cylindrical locking sleeve 36 in the socket assembly 12 is retracted. As the locking sleeve 36 is retracted, it moves towards the right, as viewed in FIGS. 1 and 2, against the influence of a biasing spring 38. Retraction of the locking sleeve 36 releases spherical metal locking elements or balls 40 for radially outward movement relative to a generally cylindrical metal socket body 42. After the locking sleeve 36 has been retracted to release the locking elements 40, the plug assembly 14 can be telescopically inserted into socket assembly 12.

As the plug assembly 14 is inserted into the socket assembly 12, a circular ramp 46 on a metal plug body 48 engages the locking elements 40 and forces them radially outwardly. Continued movement of the plug assembly 14 into the socket assembly 12 moves an annular groove 52 into radial alignment with the locking elements 40. The sleeve 36 is then released to force the locking elements 40 into the groove 52 to retain the plug assembly 14 in the socket assembly 12. Although it is preferred to use the spherical locking elements or balls 40 to hold the plug assembly 14 in the socket assembly 12, it is contemplated that cylindrical pins or other known types of locking elements could be used if desired.

In addition, as the plug assembly 14 is inserted into the socket assembly 12, the actuator member 28 moves into abutting engagement with a cylindrical nose or leading end portion 56 of the valve member 30. The axial force transmitted between the actuator member 28 and valve member 30 moves the valve member from a closed condition blocking fluid flow through the plug assembly 12 to the open condition of FIG. 1 against the influence of the biasing spring 32. An o-ring seal 60 in the socket assembly 12 engages the outside of the plug body 48 to block fluid flow between the outside of the plug body and the inside of the socket body 42. The general construction of the socket assembly 12 and plug assembly 14, with the exception of the actuator 28, is the same as is disclosed in U.S. Pat. No. 3,245,423 and will not be further described herein to avoid prolixity of description.

Actuator Member

The improved actuator member 28 moves the valve member 30 from a closed position engaging a valve seat 64 to the open condition of FIG. 1 in which the valve member 30 is spaced from the valve seat 64 to enable fluid to flow through the plug and socket assemblies 12 and 14. In addition, the actuator member 28 fuses when it is exposed to excessive heat. When the actuator member 28 fuses, it is deformable under the influence of force applied against the actuator member by the valve spring 32. Thus, when the plug and socket assemblies 12 and 14 are interconnected as shown in FIG. 1 and the coupling 10 is exposed to excessive heat, the actuator member 28 starts to melt or fuse and loses its rigidity. The actuator member can then be deformed by the force of the valve spring 32.

Figure 2:
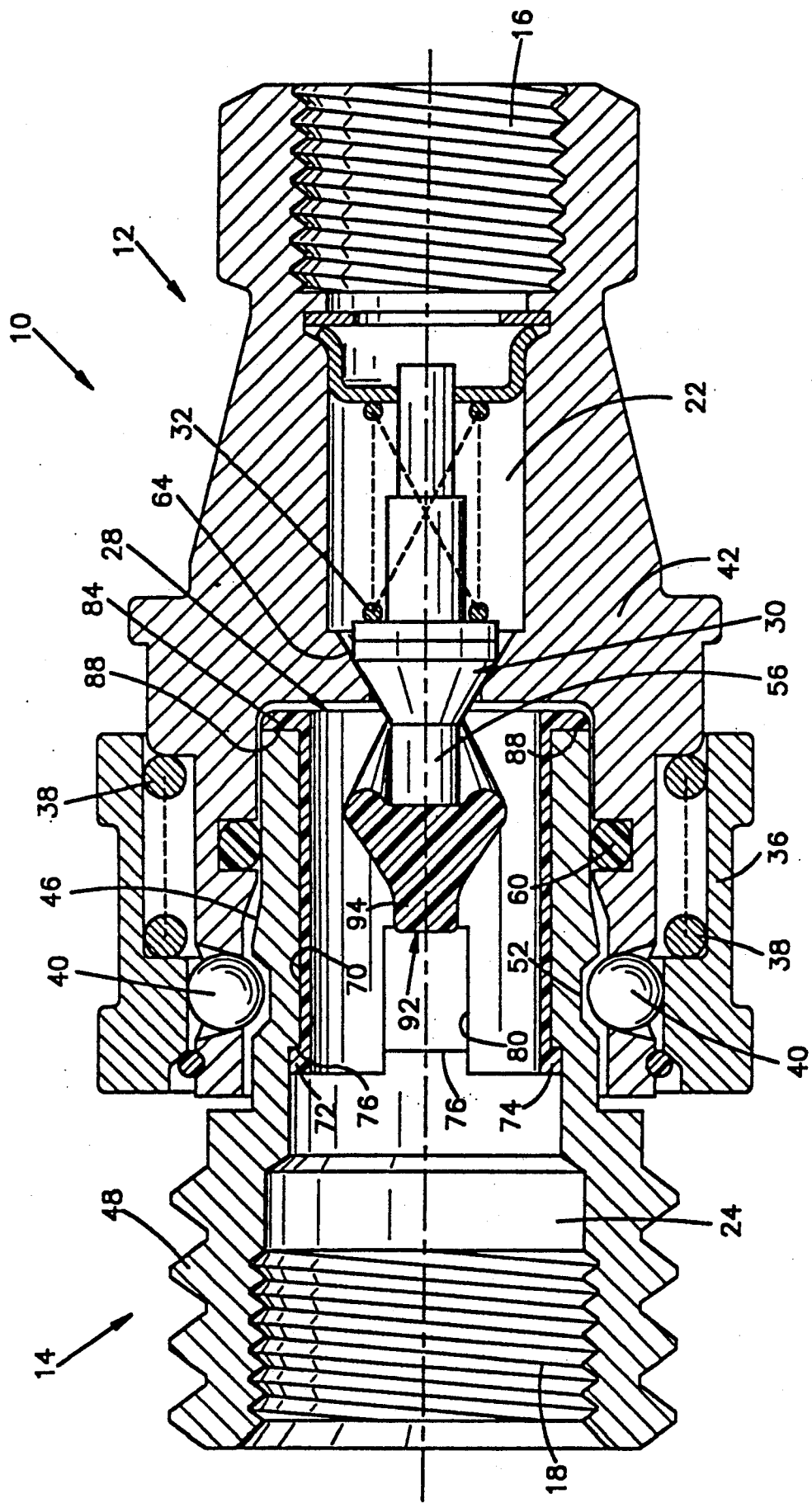
FIG. 2 is a sectional view of the coupling of FIG. 1 after fusing and deformation of the actuator member to enable the valve member to close upon exposure of the coupling to excessive heat.

As the actuator member 28 fuses and is deformed, the valve member 30 moves from the open condition of FIG. 1 to the closed condition of FIG. 2. Therefore, whenever the coupling 10 is exposed to excessive heat, the valve member 30 closes to block fluid flow through the coupling. To provide for fusing and subsequent deformation of the actuator member 28 when it is exposed to excessive heat, the actuator member is formed of a polymeric material which loses its rigidity and is reduced to a plastic state when heated to a temperature in excess of 200° F. It is believed that this feature will be particularly advantageous when the coupling 10 is used in association with flammable fluids, such as natural gas.

The one piece actuator member 28 (FIG. 3) includes a hollow cylindrical sleeve 68 which is telescopically received in a cylindrical opening 70 (FIGS. 1 and 2) formed in the rigid metal plug body 48. A pair of identical retaining lugs 72 and 74 (FIGS. 1 and 3) are provided on an inner end of the sleeve 68. The lugs 72 and 74 project radially outwardly from diametrically opposite sides of the cylindrical sleeve 68. The lugs 70 and 72 are engageable with an annular retaining surface cut inside of the plug body 28 (FIGS. 1 and 2) to hold the sleeve 68 against axially outward movement relative to the plug body 48.

When the sleeve 68 is to be telescopically inserted into the plug body 48, the sleeve 68 is circumferentially and resiliently compressed in a radially inward direction. To accommodate the resilient circumferential compression of the sleeve 68, a pair of slots 80 are formed in diametrically opposite side portions of the cylindrical sleeve 68. When the sleeve 68 is to be circumferentially compressed to enable the lugs 72 and 74 to be inserted into the cylindrical opening or passage 70 in the plug body 48, the axially inner end portion of the sleeve 68 is squeezed radially inwardly at the lugs 72 and 74. This reduces the cross sectional configuration of the sleeve 68 to enable the sleeve to be inserted into the plug opening 70.

As the circumferentially compressed sleeve 68 is inserted into the opening 70, the lugs 72 and 74 engages the inner side surface of the opening and maintain the sleeve in a circumferentially compressed condition. During continued movement of the sleeve 68 into the plug body 48, the lugs 72 and 74 move across and resiliently snap in behind the annular retaining surface 76. Engagement of the lugs 72 and 74 with the retaining surface 76 blocks axially outward movement of the sleeve 68 relative to the plug body 48.

An annular radially projecting rim 84 (FIG. 3) blocks further axially inward movement of the sleeve 68. The rim 84 has a flat radially extending inner side surface 86 (FIG. 1) which abuttingly engages a flat annular end surface 88 of the plug body 48 (FIGS. 1 and 2). Thus, the sleeve 68 is held against axially outward and inward movement relative to the plug body 48 by engagement of the retaining lugs 72 and 74 with the internal retaining surface 76 and by engagement of the radially projecting rim 84 with the outer end surface 88 of the plug body 48.

A cross or bridging bar 92 (FIGS. 1 and 3) extends diametrically between opposite sides of the sleeve 68 and the rim 84. The rectangular bridging bar 92 has a central portion, indicated generally at 94 in FIG. 3, which extends through a longitudinal central axis of the cylindrical sleeve 68. The central portion 94 of the bridging bar 92 is connected with the rim 84 and the tubular sleeve 68 by a pair of mounting sections 96 and 98 (FIG. 3).

When the plug assembly 14 is inserted into the socket assembly 12, the cylindrical leading end portion 56 (FIG. 1) of the valve member 30 abuttingly engages the flat outer surface of the central portion 94 of the bridging bar 92. As the plug assembly 14 continues to be inserted into the socket assembly 12, the force applied against the end of the valve member 30 by the central portion 94 of the bridging bar 92 moves the valve member 30 from a closed position to the open position of FIG. 1 against the influence of the biasing spring 32. The force applied against the bridging bar 92 by the valve member 30 is transmitted to the plug body 48 through the annular rim portion 84 of the actuator member 28.

When the actuator member 28 is inserted into the plug body 48 (FIG. 1), the cylindrical inner side surface of the sleeve 68 partially defines a fluid flow path through the plug body 48. Thus, fluid flowing through the plug body 48 flows through the hollow sleeve 68 and around the bridging bar 92. Fluid flow is conducted between the sleeve 68 of the actuator member 28 and the socket 12 around the valve member 30 when the valve member 30 is in the open position of FIG. 1. Of course, when the valve member 30 moves to the closed position of FIG. 2, fluid flow through the socket assembly 12 and, therefore, through the plug assembly 14, is blocked.

When the socket and plug assemblies 12 and 14 are interconnected, as shown in FIG. 1, and the coupling 10 is exposed to excessive heat, the polymeric material of the one piece actuator member 28 fuses. As it fuses, the polymeric material loses its rigidity and is reduced to a plastic state. When this occurs, the force applied against the bridging bar 92 by the valve member 30 deforms the bridging bar.

As the bridging bar 92 is deformed by the valve member 30, the bar is pressed axially inwardly relatively to sleeve 68 and is extruded or forced sidewardly relative to the sleeve in a manner similar to that indicated schematically in FIG. 2. It should be understood that although one particular deformation of the bridging bar 92 has been shown schematically in FIG. 2, the bridging bar could deform in a different manner depending upon the size of the bar, the force of the valve biasing spring 32, and the configuration of the leading end portion 56 of the valve member 30. As the bridging bar 92 is deformed, the valve member 30 moves from the open position of FIG. 1 to the closed position of FIG. 2. When the valve member 30 is in the closed position of FIG. 2, it engages the valve seat 64 to block fluid flow through the socket assembly 12.

In one specific embodiment of the actuator member 28, the actuator member was molded as one piece of an acetal plastic, specifically "DELRIN". This specific plastic material fuses at a temperature of approximately 350° F. Although for certain uses a fusing temperature of 350° F. with a resulting closing of the valve member 30 may be satisfactory, it is contemplated that the coupling 10 will be used in environments wherein fusing and a resulting closing of the valve member 30 should occur at a temperature of 200° F. to 250° F. When the actuator member 28 is to fuse and the valve member 30 to close at a relatively low temperature of 200° F. to 250° F., the actuator member 28 may be formed of a material other than acetal plastic. For instance, the one piece actuator member 30 may be formed of an acrylic plastic having the required low fusing temperature. Of course, the actuator member 28 could be formed of other known polymeric material if desired.

In one specific embodiment of the one piece actuator member 28, the cross or bridging bar 92 has a width, measured diametrically of the sleeve 68 and perpendicular to a longitudinal axis of the bar, of approximately 0.13 inches. The bridging bar 92 has a width, as measured along the longitudinal central axis of the sleeve 68, of approximately 0.5 inches. This particular bridging bar 92 has a length, as measured diametrically of the sleeve 68, of approximately 0.656 inches, the inside diameter of the sleeve 68.

In this specific embodiment of the invention, the sleeve 68 has an outside diameter of approximately 0.750 inches and a wall thickness of approximately 0.047 inches. The slots 80 have an axial length of approximately 0.40 inches and a chordal width of approximately 0.25 inches. The actuator member 28, itself, has an overall length of approximately 1.01 inches. The rim 84 has an outside diameter of approximately 0.927 inches.

It should be understood that the foregoing specific dimensions for one embodiment of the actuator member 28 have been set forth herein for the purposes of clarity of description and not for purposes of limitation of the invention. It is contemplated that the actuator member 28 will be constructed with dimensions which differ from these specific dimensions. Thus, the dimensions of the actuator member 28 will vary as a function of the dimensions of the plug body 48 with which the actuator member is associated, the strength of the particular material from the which the actuator member is made, and other factors.

Since the actuator member 28 is molded as one piece of a polymeric material having the desired fusing temperature, it is relatively easy to construct the actuator member 28 with the desired configuration. Thus, the sleeve 68, rim 84, and the bridging bar 92 of the actuator member 28 are molded as one piece. This results in the actuator member 28 being relatively inexpensive to fabricate.

The actuator member 28 is easily mounted in the plug body 48 by merely inserting the actuator member 28 into the fluid passage 24. As the actuator member 28 is inserted, the retaining lugs 72 and 74 resiliently snap in place against the annular retainer surface 76. The ease with which the actuator member 28 is mounted in the plug body 48 and its relatively low cost reduces the overall cost of forming the improved plug assembly 14.

Actuator Member—Second Embodiment

In the embodiment of the invention illustrated in FIGS. 1-3, the actuator member 28 includes retaining lugs 72 and 74 on the rim portion 84 which grip the rigid metal plug body 48 to hold the actuator member against axial movement relative to the plug body. In the embodiment of the invention illustrated in FIG. 4, the rim portion of the actuator member is eliminated and the actuator member is held in place by an annular mounting bead or lug on the inner end portion of the actuator member. Since the embodiment of the invention illustrated in FIG. 4 is generally similar to the embodiment invention illustrated in FIGS. 1-3, similar numerals will be utilized to designate similar components, the suffix letter "a" being added to the numerals in FIG. 4 to avoid confusion.

The plug assembly 14a has a metal body 48a in which an actuator member 28a is mounted. The actuator member 28a is molded as one piece from a suitable polymeric material. The actuator member 28a includes a hollow cylindrical sleeve 68a which partially defines a fluid flow path through the plug assembly 14a. The actuator member 28a also has a bridging bar 92a which extends through a central axis of the sleeve 68a. The bridging bar 92a engages a valve member in a socket assembly to move the valve member from a closed condition to an open condition as the plug assembly 14a is inserted into the socket assembly.

In accordance with a feature of this embodiment of the invention, an axially inner end portion of the circumferentially and resiliently compressible sleeve 68a is provided with a generally annular retaining lug or bead 104. The annular bead 104 engages a correspondingly shaped groove 106 to hold the actuator member 28a against axial movement in either an inward or an outward direction relative to the plug body 48a. Thus, the annular retaining lug or bead 104 engages an axially outer side of the groove 106 to block axially outward movement of the actuator member 28a. Similarly, the retaining lug or bead 104 engages an axially inner side of the groove 106 to block axially inward movement of the actuator member 28a.

The actuator member 28a is easily mounted in the rigid metal plug body 48a. When this is to be done, the sleeve 68a is circumferentially and resiliently compressed in a radially inward direction. To accommodate the resilient circumferential compression of the sleeve 68a, a pair of slots 80a are formed in diametrically opposite side portions of the sleeve.

When the sleeve 68a has been circumferentially and resiliently compressed, the sleeve is inserted through the open end of the plug body 48a. As this occurs, the bead 104 engages the inner side surface of the plug body 48 to maintain the sleeve in a circumferentially compressed condition. During continued movement of the sleeve 68a into the plug body 48a, the bead 104 moves into alignment with and resiliently snaps into the annular groove 106.

When the plug assembly 14a is connected with a socket assembly (not shown), they are interconnected in the same manner shown in FIG. 1. The valve in the socket assembly is held open by the cross or bridging bar 92a. Upon exposure of the coupling to excessive heat, the material of the actuator member 28a fuses and loses its rigidity. When this occurs, the force applied against the actuator bar 92a deforms the actuator bar 92a to allow the valve member to close in the manner described in conjunction with the embodiment of the invention illustrated in FIGS. 1-3.

Actuator Member-Third Embodiment

In another embodiment of the actuator member 28a, the cross or bridging bar 92a had a stronger construction. In this embodiment of the invention, the bridging bar 92a had sufficient strength so that only minor deformation of the bridging bar 92a occurred when the coupling was exposed to excessive heat. The bridging bar 92a could withstand the forces applied against the bridging bar by the valve member without deformation of the bridging bar to such an extent as to allow the valve member to close.

In this embodiment of the invention, the annular retaining lug or bead 104 was deformed to release the actuator member 28a for axially inward movement under the influence of the valve spring. Thus, when the actuator member 28a was exposed to excessive heat, it moved toward the left (as is view in FIG. 4). As this occurs, the retaining bead 104 was sheared away so that the projecting portion of the retaining bead remained in the annular groove 106. Thus, in this embodiment of the invention, the deformation of the actuator member 28a resulted in a severing of a portion of the actuator member, that is the retaining bead 104, to release the actuator member for axially inward movement under the influence of forces applied against the bridging bar 92a. As the actuator member 28a moved axially inwardly, the valve member in the socket assembly is released for movement to a closed position blocking fluid flow through the socket assembly.

It is contemplated that the actuator member 28a may be constructed in such a manner as to result in closing of the socket valve as a result of deformation of both the bridging bar 92a and the retaining bead 104. Thus, the bridging bar 92a would be deformed to such an extent as to allow the socket valve to partially close. The retaining bead 104 would also be deformed to such an extent as to allow the socket valve to partially close. The combined deformation of the bridging bar 92a and retaining bead 104 would allow the socket valve to fully close.

Actuator Member-Fourth Embodiment

In the embodiment of the invention illustrated in FIG. 5, the bridging or cross bar is provided with a relatively thick or heavy central portion and a relatively thin or weak mounting portions. Since the embodiment of the invention illustrated in FIG. 5 if generally similar to the invention illustrated in FIGS. 1-3, similar numerals will be utilized to designate similar components, the suffix letter "b" being added to the numerals of FIG. 5 to avoid confusion.

The actuator member 28b includes an annular rim portion 84b which projects radially outwardly from a cylindrical sleeve 68b. A cross or bridging bar 92b extends diametrically across the cylindrical fluid passage formed in the sleeve member 68b. The bridging bar 92b has a relatively large circular portion 94b connected with the rim 84b and sleeve 68b by mounting sections 96b and 98b. The cross member 92b extends along the sleeve 68b for a substantial portion of the length of the sleeve 68b.

Due to the relatively large size of the central portion of 94b of the bridging bar, the central portion is easily engagable with the end of a valve member in a socket assembly. The relatively thin mounting portions 96b and 98b are readily deformed upon fusing of the polymeric material of the actuator member 28b when the actuator member is exposed to excessive heat. The actuator member 28b is molded as one piece of a suitable polymeric material.

Actuator Member-Fifth Embodiment

In the embodiment of the invention illustrated in FIG. 6, the actuator member is provided with a bridging or cross bar formed by a plurality of radially extending mounting sections which intersect at a central portion of the bridging bar. Since the embodiment of the invention illustrated in FIG. 6 is generally similar to the embodiment of the invention illustrated in FIGS. 1-3 similar numerals will be utilized to designate similar components, the suffix "c" being associated with the numerals of FIG. 6 to avoid confusion.

The actuator member 28c includes an annular rim portion 84c. The rim portion 84c extends radially outwardly from a cylindrical sleeve 68c. The inner side surfaces of the tubular sleeve 68c form a passage through which fluid flows through actuator member 28c.

A bridging or cross member 92c includes a plurality of radially extending arms or spokes 112, 114, and 116 which intersect at a central portion 94c of the bridging bar. The three arms or spokes 112, 114, and 116 provide a relatively stable structure which can withstand substantial valve biasing spring forces prior to exposure of the actuator member 28c to excessive heat. Upon exposure of the actuator member 28c to excessive heat, the relatively thin arms or spokes 112, 114, and 116 are readily deformed to enable the socket member to close. The actuator member 28c is molded as one piece of a suitable polymeric material.

Actuator Member-Sixth Embodiment

In the embodiment of the invention illustrated in FIG. 7, the construction of the actuator member has been simplified by eliminating the sleeve and mounting the actuator member in one end of the plug. Since the embodiment of the invention illustrated in FIG. 7 is somewhat similar to the embodiment of the invention illustrated in FIGS. 1-3, similar numerals will be utilized to designated similar components, the suffix letter "d" being added to the numerals of FIG. 7 to avoid confusion.

The actuator member 28d is mounted in the outer end portion of a plug body 48d. In this embodiment of the invention, the actuator member 28d has a rectangular configuration and includes only a cross or bridging bar 92d. The cross or bridging bar 92d has a central portion 94d which is engaged by the leading end of a socket valve member in the same manner in which the socket valve member engages the bridging bar 92 of FIG. 1.

Mounting portions 96d and 98d of the bridging bar 92d are received in slots 122 and 124 formed in the outer end portion of the body 48d of the plug assembly. The bridging bar 92d has a uniform rectangular cross sectional configuration throughout its length in the same manner as does the bridging bar 92 of the embodiment illustration in FIGS. 1-3. However, instead of being connected with a sleeve, the bridging bar 92d is mounted directly in retaining slots formed in the end of the plug body 48d.

The bridging bar 92d is molded as one piece of a suitable polymeric material which fuses when the plug body 48d is exposed to excessive heat. When the material of the bridging bar 92d fuses, it is readily deformed by the force applied against the bridging bar by a socket valve member in the manner described in conjunction with the embodiment of the invention illustrated in FIGS. 1-3.

SUMMARY

In view of the foregoing description, it is apparent that the present invention provides a new and improved coupling having a plug assembly 14 and a socket assembly 16 in which a heat fusible actuator member 28 opens a valve 30 against the influence of a biasing spring 32 as the plug and socket assemblies are interconnected. When the coupling 10 is exposed to excessive heat, the actuator member 28 fuses and is deformed under the influence of the force applied against the actuator member by the valve member 30. As the actuator member 28 deforms, the valve member 30 moves from an open condition (FIG. 1) to a closed condition (FIG. 2).

The actuator member is formed of one piece of heat fusible polymeric material. In some embodiments, the actuator member 28 includes a resiliently compressible tubular sleeve 68. The sleeve 68 is disposed in and is connected with the plug body 42. A bridging portion 92 extends inwardly from the sleeve 68. The bridging portion 92 is engaged by the valve member 30 and retains the valve member in an open condition prior to exposure of the coupling 10 to excessive heat.

Upon exposure of the coupling 10 to excessive heat, at least a portion of the polymeric material of the actuator member 28 fuses and is deformed by the force applied against the actuator member by the valve 30. In one embodiment of the invention (FIGS. 1-3), the bridging portion 92 of the actuator member 28 is deformed when the coupling 10 is exposed to excessive heat. In another embodiment of the invention (FIG. 4), the mounting or retaining bead 104 which interconnects the sleeve 68a and the plug body 48a, is deformed to release the actuator member 28a from movement under the influence of forces applied against the actuator member by the socket valve when the coupling is exposed to excessive heat.

Having described specific preferred embodiments of the invention, the following is claimed:

1. A coupling for use in connecting a pair of conduits in fluid communication, said coupling comprising a plug assembly having a fluid flow passage therethrough and being adapted to be connected with one of the conduits, a socket assembly having a fluid flow passage therethrough and being adapted to be connected with another of the conduits, a first one of said assemblies including a valve member movable between a closed condition blocking the fluid flow passage in the first one of said assemblies and spring means for applying force against said valve member urging said valve member toward the closed condition, a second one of said assemblies including a rigid metal body and a heat fusible actuator member which is disposed in the fluid flow passage in the second one of said assemblies, said actuator member including a one piece tubular sleeve portion formed of a heat fusible polymeric material, said sleeve portion being circumferentially and resiliently compressible from a relatively large cross sectional configuration to a relatively small cross sectional configuration to enable said sleeve portion to be inserted into said rigid metal body, said sleeve portion including retainer means for engaging said rigid metal body upon insertion of said sleeve portion into said rigid metal body and resilient expansion of said sleeve portion from a relatively small cross sectional configuration to a relatively large cross sectional configuration to retain said sleeve portion against movement relative to said rigid metal body, said actuator member being engageable by said valve member to hold said valve member in the open condition against the influence of said spring means, said retainer means being effective to hold said sleeve portion against axial movement under the influence of force applied against said actuator member by said valve member, said retainer means being fusible and deformable under the influence of force applied against said actuator member by said valve member upon exposure of said actuator member to excessive heat to release said valve member for movement from the open codition.

2. A coupling as set forth in claim 1 wherein said sleeve portion includes surface means for defining a plurality of slots at one end portion of said sleeve portion, said slots enabling said sleeve portion to be resiliently compressed from the relatively large cross sectional configuration to the relatively small cross sectional configuration, said retainer means being disposed at said one end portion of said sleeve portion.

3. A coupling as set forth in claim 2 wherein said sleeve portion further includes a bridging portion connected with said sleeve portion and extending through a longitudinal central axis of said sleeve portion.

4. A coupling for use in connecting a pair of conduits in fluid communication, said coupling comprising a plug assembly having a fluid flow passage therethrough and being adapted to be connected with one of the conduits, a socket assembly having a fluid flow passage therethrough and being adapted to be connected with another of the conduits, a first one of said assemblies including a valve member movable between a closed condition blocking the fluid flow passage in the first one of said assemblies and an open condition in which said valve member is ineffective to block the fluid flow passage in the first one of said assemblies and spring means for applying force against said valve member urging said valve member toward the closed condition, a second one of said assemblies including a rigid metal body and a heat fusible actuator member, said rigid metal body including means for defining an annular retaining surface, said actuator member including a tubular sleeve portion formed of a heat fusible material and disposed in said rigid metal body and through which the fluid flow passage in the second one of said assemblies extends, said tubular sleeve portion having a cylindrical configuration and having a cylindrical outer side surface disposed in abutting engagement with a cylindrical inner side surface of said rigid metal body, said sleeve portion including surface means for defining a plurality of slots which extend from one end of said sleeve portion and enable said sleeve portion to be resiliently compressed, said sleeve portion including a plurality of outwardly projecting retaining surfaces disposed at said one end of said sleeve portion and engageable with said annular retaining surface on said rigid metal body to block axial movement of said sleeve portion in at least one direction relative to said rigid metal body, said retaining surfaces on said sleeve portion being engageable with said annular retaining surface on said rigid metal body by compressing said one end of said sleeve portion, moving said sleeve portion axially into said rigid metal body and resiliently expanding said sleeve portion to move said retaining surfaces on said sleeve portion into engagement with said annular retaining surface on said rigid metal body, said actuator member and said valve member being engageable to hold said valve member in the open condition against the influence of said spring means, at least a portion of said actuator member being heat fusible and deformable under the influence of force applied against said actuator member by said valve member upon exposure of said actuator member to excessive heat to release said valve member for movement from the open condition as said actuator member deforms.

5. A coupling as set forth in claim 4 wherein said heat fusible actuator member further includes a central portion which is heat fusible and extends through a central axis of the fluid flow passage.

6. A coupling for use in connecting a pair of conduits in fluid communication, said coupling comprising a plug assembly having a fluid flow passage therethrough and being adapted to be connected with one of the conduits, a socket assembly having a fluid flow passage therethrough and being adapted to be connected with another of the conduits, a first one of said assemblies including a valve member movable between a closed condition blocking the fluid flow passage in the first one of said assemblies and an open condition in which said valve member is ineffective to block the fluid flow passage in the first one of said assemblies and spring means for applying force against said valve member urging said valve member toward the closed condition, a second one of said assemblies including a rigid metal body and a heat fusible actuator member, said metal body including means for defining an annular retaining surface, said actuator member being formed of one piece of heat fusible polymeric material and including a tubular sleeve portion disposed in said rigid metal body and through which the fluid flow passage in the second one of said assemblies extends and a retainer portion which projects radially outwardly from and is integrally formed with said sleeve portion, said tubular sleeve portion having a cylindrical configuration and having a cylindrical outer side surface disposed in abutting engagement with a cylindrical inner side surface of said rigid metal body, said retainer portion including means for engaging said annular retaining surface on said rigid metal body to block axial movement of said sleeve portion relative to said rigid metal body, said actuator member and said valve member being engageable to hold said valve member in the open condition against the influence of said spring means, at least a portion of said actuator member being heat fusible and deformable under the influence of force applied against said actuator member by said valve member upon exposure of said actuator member to excessive heat to release said valve member for movement from the open condition as said actuator member deforms.

7. A coupling as set forth in claim 6 wherein said annular retaining surface is disposed on an outer end portion of said rigid metal body, said retainer portion of said actuator member including an annular rim portion which is disposed at one axial end of said sleeve portion.

8. A coupling as set forth in claim 6 wherein said sleeve portion includes means for enabling one end of said sleeve portion to be resiliently compressed, said retainer portion including a plurality of outwardly projecting retaining surfaces disposed at said one end of said sleeve portion, said retaining surfaces on said sleeve portion being engageable with said annular retaining surface on said rigid metal body by compressing said one end of said sleeve portion, moving said sleeve portion axially into said rigid metal body and resiliently expanding said sleeve portion to move said retaining surfaces on said sleeve portion into engagement with said annular retaining surface on said rigid metal body.

9. A coupling as set forth in claim 6 wherein said heat fusible actuator member further includes a central portion which is heat fusible and extends through a central axis of the fluid flow passage.

* * * * *